United States Patent [19]

Iso

[11] Patent Number: 5,737,488
[45] Date of Patent: Apr. 7, 1998

[54] SPEECH RECOGNIZER

[75] Inventor: Ken-Ichi Iso, Tokyo, Japan

[73] Assignee: NEC Corporation, Tokyo, Japan

[21] Appl. No.: 483,321

[22] Filed: Jun. 7, 1995

[30] Foreign Application Priority Data

Jun. 13, 1994 [JP] Japan .................................. 6-129985

[51] Int. Cl.$^6$ .................................................. G10L 5/06
[52] U.S. Cl. ............................... 395/2.65; 395/2.64
[58] Field of Search .............................. 395/2, 2.1, 2.6, 395/2.64, 2.65

[56] References Cited

U.S. PATENT DOCUMENTS

| | | | |
|---|---|---|---|
| 5,199,077 | 3/1993 | Wilcox et al. | 381/43 |
| 5,241,619 | 8/1993 | Schwartz et al. | 395/2 |
| 5,268,990 | 12/1993 | Cohen et al. | 395/2 |

FOREIGN PATENT DOCUMENTS 0 533 491  3/1993  European Pat. Off. .

OTHER PUBLICATIONS

Sukkar et al., "A Two Pass Classifier for Utterance Rejection in Keyword Spotting", ICASSP-93, vol. 2, pp. 451-454, Apr. 27-30, 1993.

Su et al., "Speech Recognition Using Weighted HMM and Subspace Projection Approaches", IEEE Transactions on Speech and Audio Processing vol. 2, No. 1, Part 1, pp. 69-79, Jan. 1994.

X.D. Huang et al., "Semi-Continuous Hidden Markov Models For Speech Signals", Computer and Language (1989) 3, pp. 239-251.

Y. Ariki, "Two-Stage Transition Mixture Distribution HMM", Proceeding I of the Society of Acoustical Engineers of Japan, Oct., 1992, pp. 85-86.

S. Takahashi et al., "Evaluation Of Semi-Continuous Bigram Restricted HMM With Continuous Speech", Proceeding I of the Society of Acoustical Engineers of Japan, Oct., 1992, pp. 159-160.

*Primary Examiner*—Krista Zele
*Assistant Examiner*—Scott L. Weaver
*Attorney, Agent, or Firm*—Foley & Lardner

[57] ABSTRACT

In order to recognize input speech by analyzing the input speech at a predetermined time interval, extracting feature vectors and calculating likelihood value of a reference pattern model of each category to be recognized. A first probability calculation means calculates a probability that a first hidden Markov model having internal state number as output symbol for each of categories to be recognized outputs an internal state number. A second probability calculation means calculates a probability that a second hidden Markov model having transition probabilities of internal state number and feature vector output probability distribution for each of the respective internal state numbers outputs a feature vector. A likelihood value calculation means calculates likelihood value of a reference pattern model of the category to be recognized by using outputs of the first and second probability calculation means.

6 Claims, 7 Drawing Sheets

<PRIOR ART 2>

SPEECH RECOGNIZER

BACKGROUND OF THE INVENTION

The present invention relates to a speech recognizer for automatically recognizing speech signals expressed by time series of feature vectors.

Hidden Markov models (HMM) have been used extensively as a standard pattern model of the speech recognition. The HMM is well-known and detailed in Literature 1 ("Fundamentals of Speech Recognition", L. Rabiner & B-H Juang, 1993, Published by Prentice Hall). In the HMM, however, the output probability distributions in different states are independent of and not correlated to one another, and speech patterns modeled as HMM have inevitable discontinuities produced at the points of transition of states, thus reducing the recognition rate. This is shown in FIG. 1, in which Gaussian output probability distributions in individual states are used. In this case, the speech pattern modeled as HMM is distributed statistically around the mean vector of the Gaussian distribution. The mean vector train has discontinuities at the boundaries of transition from state 1 to state 2 and also from state 2 to state 3, and these discontinuities appear in the output speech pattern. To cope with this problem, there has been proposed a method, in which a plurality of output probability distributions are made to correspond to respective states and a coefficient for determining an output probability distribution to be used depends on an output probability distribution that has been used before one time point (Prior art method 1, Literature 2: Ariki, "Two-stage Transition Mixture Distribution HMM", Proceeding I of the Society of Acoustical Engineers of Japan, October, 1992, pp. 85). By introducing this correlation, it is possible to reduce continuous use of output probability distributions of greatly different mean vectors, and this permits solving the HMM problem as described before. Prior art method 1, however, requires an enormous number of coefficients, and it is difficult to obtain accurate estimation of parameters without a huge amount of training speech data. Therefore, the method is infeasible. There is another proposed method, in which weighting coefficients of semi-continuous HMM output probability distributions are adapted to be dependent on output probability distributions used before one time instant by using chain probabilities (bigrams) of code series of vector quantized (VQ) input speech (Prior art method 2, Literature 3: Takahashi et al, "Evaluation of Semi-continuous Bigram Restricted HMM with Continuous Speech", Proceeding I of the Society of Acoustical Engineers of Japan, October, 1992, pp. 161). This method, however, requires extra calculations, i.e., calculating weighting coefficients afresh by vector quantizing input speech, in addition to the semi-continuous HMM calculations. Furthermore, the calculation formulas involved are based on heuristically defined, and the calculations are not optimum ones based on statistical theory.

SUMMARY OF THE INVENTION

The present invention therefore proposes a new speech recognizer capable of solving the problems in the HMM that the standard patterns have discontinuities at state transition boundaries. The speech recognizer according to the present invention requires neither enormous parameters as involved in Prior art method 1 nor extra calculations as involved in Prior art method 2, and proposes an optimum recognition/ study process based on statistical theory rather than on any heuristic method.

According to one aspect of the present invention, there is provided a speech recognizer for recognizing input speech by analyzing the input speech at a predetermined time interval, extracting feature vectors and calculating likelihood value of a reference pattern model of each category to be recognized, comprising: first probability calculation means for calculating a probability that a first hidden Markov model having internal state number as output symbol for each of categories to be recognized outputs an internal state number; second probability calculation means for calculating a probability that a second hidden Markov model having transition probabilities between internal state number and feature vector output probability distribution for each of the respective internal state numbers outputs a feature vector; and likelihood value calculation means for calculating likelihood value of a reference pattern model of the category to be recognized by using outputs of the first and second probability calculation means.

According to another aspect of the present invention, there is provided a speech recognizer comprising: a first HMM parameter memory for storing as first HMM parameters of individual words w, transition probability $a_{mn}^{(1)}$ (m, n=1, ..., $N_w$) from state m to state n, and probability $b_{nk}^{(1)}$ (k=1, ..., K) of outputting output symbol $s_k$ in state n; a second HMM parameter memory for storing as second HMM parameters common to all the words, parameters of distribution functions representing transition probability $a_{jk}^{(2)}$ (j, k=1, ..., K) from internal state 3 to internal state k and output probability $b_k^{(2)}$ ($o_t$) of outputting feature vector $o_t$ in internal state k; work memory as an working area for tentatively storing the output probability and forward probability when calculating the likelihood value of each word to be recognized with a reference pattern model; and recognition processing means including first calculation means for calculating the output probability $b_k^{(2)}(o_t)$ of outputting the feature vector $o_t$ in the internal state k on the basis of the output probability distribution parameters stored in the second HMM parameter memory and storing it as variable B in the work memory, clearing means for clearing array variables A (w,t,n,k) in the work memory for calculating the forward probability, second calculation means for calculating contribution to the forward probability when the feature vector $o_t$ is output through transition from state m and internal state J to state n and internal state k, from the parameters stored in the first and second HMM parameter memories and work memory and adding it to the array variables A (w,t,n,k), and comparing the forward probability A (w,T,n,k) for each word w stored in the work memory successively to obtain the maximum value, and recognition result of the corresponding word having the maximum value.

Other objects and features will be clarified from the following description with reference to attached drawings.

PREFERRED EMBODIMENTS OF THE INVENTION

Figure 1:
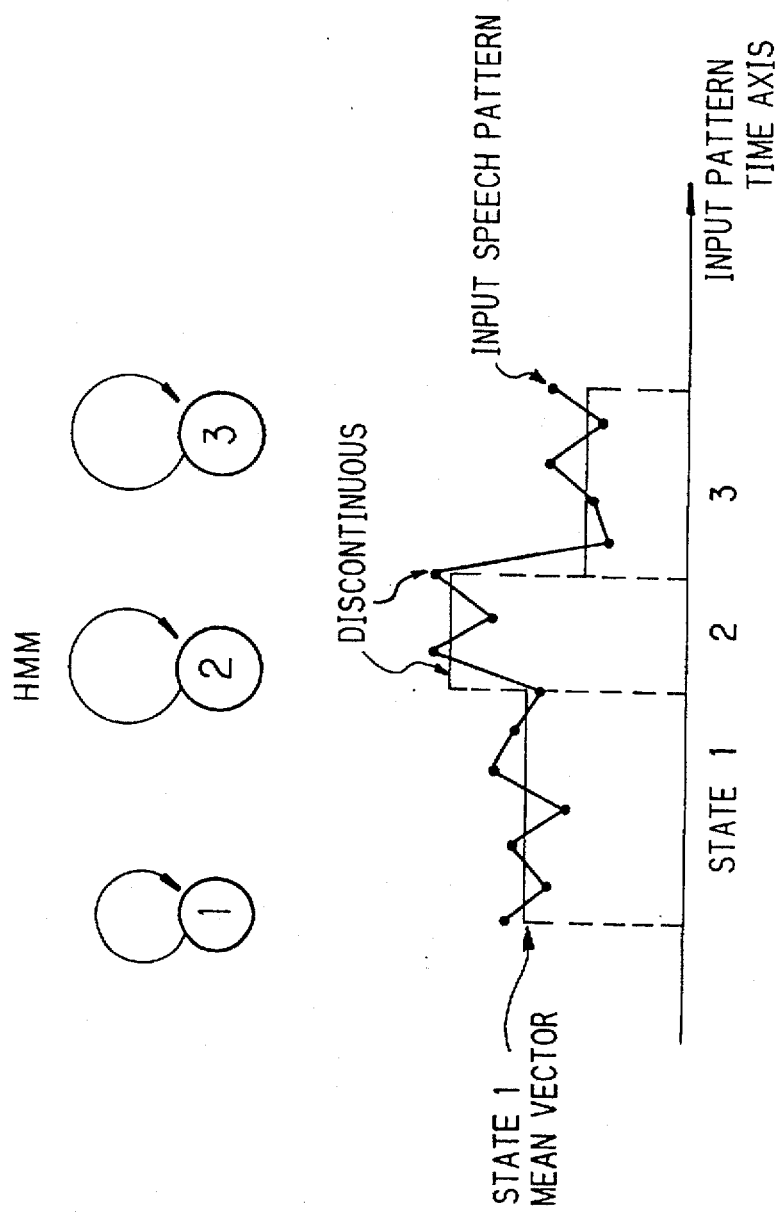
FIG. 1 shows a drawing for explaining the conventional speech recognizer.

Among the categories of the subject of speech recognition are the vocal sound, syllable, word, sentence, etc. The following detailed description concerns the word, but the same applies to the other cases as well.

Denoting the word by probability variable W, the input speech (feature vector time series of length T) by $O \equiv O_1 \ldots O_t \ldots O_T$, and the internal state No. time series by $S \equiv S_1 \ldots S_t \ldots S_T$, the posterior probability P(W|O) of the word W is given as $$P(W|O) = \frac{P(O|W)P(W)}{P(O)} \quad (1)$$

$$P(O|W) = \sum_S P(O|S)P(S|W) \quad (2)$$

In the above Equations, the summation symbol represents summation concerning time series S for all the possible internal state Nos. According to the present invention, it is assumed that the internal state No. can take any of K integral numbers from 1 to K. In the following equation, variable $s_k$ represents the internal state No.

$$P(O|W) = \sum_S P(O|S)P(S|W) \quad (3)$$
$$= \sum_{k_1=1}^{K} \ldots \sum_{k_T=1}^{K} P(O|s_{k_1} \ldots s_{k_T}) P(s_{k_1} \ldots s_{k_T}|W)$$

In the word W, the probability $P(S_{k1}, \ldots, s_{kT}|W)$ that the internal state No. series $S = s_{k1}, \ldots, s_{kT}$ is used, can be expressed by discrete HMM with possible internal state Nos. $(1, \ldots, K)$ as output symbols. Hereinafter, this HMM is referred to as HMM-1 in the sense that it refers to the first HMM.

When the number of the HMM-1 states of the word W is N, $$P(s_{k_1} \ldots s_{k_T}|W) = \sum_{n_1=1}^{N} \ldots \sum_{n_T=1}^{N} \prod_{t=1}^{T} a^{(1)}_{n_{t-1}n_t} b^{(1)}_{n_t k_t} \quad (4)$$

$$a^{(1)}_{n_0 n_1} \equiv \pi^{(1)}_{n_1}$$

where $a_{mn}^{(1)}$ is the transition probability from state m to state n, and $b_{nk}^{(1)}$ is the output probability of output symbol $s_k$ in state n. The probability $P(O|s_{k1}, \ldots, s_{kT})$ of generation of input speech feature vector series $O = o_1 \ldots o_t \ldots o_T$ from the internal state No. series $S = s_{k1} \ldots s_{kT}$ can be expressed as second HMM with internal state Nos. $(1, \ldots, K)$ as states. Hereinafter, the HMM-2 state is referred to as "internal state" to distinguish it from the HMM-1 state.

$$P(O|s_{k_1} \ldots s_{k_T}) = \sum_{t=1}^{T} a^{(2)}_{k_{t-1}k_t} b^{(2)}_{k_t}(o_t) \quad (5)$$

$$a^{(2)}_{k_0 k_1} \equiv \pi^{(2)}_{k_1}$$

where $a_{jk}^{(2)}$ is the transition probability from internal state j to internal state k, and $b_k^{(2)}(o_t)$ is the probability of outputting feature vector $o_t$ in internal state k. In summary, $$P(O|W) = \sum_{n_1=1}^{N} \ldots \sum_{n_T=1}^{N} \sum_{k_1=1}^{K} \ldots \sum_{k_T=1}^{K} \sum_{t=1}^{T} a^{(1)}_{n_{t-1}n_t} b^{(1)}_{n_t k_t} a^{(2)}_{k_{t-1}k_t} b^{(2)}_{k_t}(o_t) \quad (6)$$

The forward probability that feature vector $o_t$ is output upon reaching of state n and internal state k at time instant t, is defined as follows.

$$\alpha_t(n,k) = \sum_{n_1=1}^{N} \ldots \sum_{n_t=1}^{N} \sum_{k_1=1}^{K} \ldots \sum_{k_t=1}^{K} \delta_{n_t,n} \delta_{k_t,k} \prod_{s=1}^{t} a^{(1)}_{n_{s-1}n_s} b^{(1)}_{n_s k_s} a^{(2)}_{k_{s-1}k_s} b^{(2)}_{k_s}(o_s) \quad (7)$$

$$= \sum_{n'=1}^{N} \sum_{k'=1}^{K} \alpha_{t-1}(n',k') a^{(1)}_{n'n} b^{(1)}_{nk} a^{(2)}_{k'k} b^{(2)}_{k}(o_t)$$

$$P(O|W) = \sum_{n=1}^{N} \sum_{k=1}^{K} \alpha_T(n,k)$$

Likewise, the backward probability that observed feature vector $o_{t+1}$ is output at time instant (t+1) and that state and internal state k are reached at time point t, can be defined as $$\beta_t(n,k) = \delta_{n_t,n} \delta_{k_t,k} \sum_{n_{t+1}=1}^{N} \ldots \sum_{n_T=1}^{N} \sum_{k_{t+1}=1}^{K} \ldots \sum_{k_T=1}^{K} \prod_{s=1}^{t} a^{(1)}_{n_{s-1}n_s} b^{(1)}_{n_s k_s} a^{(2)}_{k_{s-1}k_s} b^{(2)}_{k_s}(o_s) \quad (8)$$

$$= \sum_{n'=1}^{N} \sum_{k'=1}^{K} a^{(1)}_{nn'} b^{(1)}_{n'k'} a^{(2)}_{kk'} b^{(2)}_{k'}(o_{t+1}) \beta_{t+1}(n',k')$$

$$\beta_T(n,k) = 1$$

$$P(O|W) = \sum_{n_1=1}^{N} \sum_{n_2=1}^{N} \sum_{k_1=1}^{K} \sum_{k_2=1}^{K} \alpha_t(n_1, k_1) a^{(1)}_{n_1 n_2} b^{(1)}_{n_2 k_2} a^{(2)}_{k_1 k_2} b^{(2)}_{k_2}(o_{t+1}) \beta_{t+1}(n_2, k_2) \quad (9)$$

As a consequence, it is seen that the probability P(O|W) can be obtained through recurrence formula calculation of the forward probability on the TRELIS specified by three dimensions of the time t, state n and internal state k. In the prior art HMM, calculations for O(T·N) lattice points on two-dimensional TRELIS specified by time t and state n were necessary. With the system according to the present invention, the calculation for O(T·N·K) lattice points is necessary when it is made as the above formula calculation. An approximation method to reduce the amount of computations for the present invention will be described later.

Estimation of the transition probability and output probability in the training can be executed is possible by applying the same re-estimation formulas as in the case of the prior art HMM on the three-dimensional TRELIS.

$$\gamma_t(n_1,n_2,k_1,k_2) \equiv \alpha_t(n_1,k_1) a^{(1)}_{n_1 n_2} b^{(1)}_{n_2 k_2} a^{(2)}_{k_1 k_2} b^{(2)}_{k_2}(o_{t+1}) \beta_{t+1}(n_2,k_2) \quad (10)$$

$$\gamma(n_1,n_2,k_1,k_2) \equiv \sum_{t=1}^{T} \gamma_t(n_1,n_2,k_1,k_2)$$

$$\overline{a}^{(1)}_{mn} = \frac{\sum_{k_1'=1}^{K} \sum_{k_2'=1}^{K} \gamma(m,n,k_1',k_2')}{\sum_{n_1'=1}^{N} \sum_{k_1'=1}^{K} \sum_{k_2'=1}^{K} \gamma(m,n_2',k_1',k_2')} \quad (11)$$

$$\overline{b}^{(1)}_{nk} = \frac{\sum_{n_1'=1}^{N} \sum_{k_1'=1}^{K} \gamma(n_1',n,k_1',k)}{\sum_{n_1'=1}^{N} \sum_{k_1'=1}^{K} \sum_{k_2'=1}^{K} \gamma(n_1',n,k_1',k_2')} \quad (12)$$

$$\overline{a}^{(2)}_{jk} = \frac{\sum_{n_1'=1}^{N} \sum_{n_2'=1}^{N} \gamma(n_1',n_2',j,k)}{\sum_{n_1'=1}^{N} \sum_{n_2'=1}^{N} \sum_{k_2'=1}^{K} \gamma(n_1',n_2',j,k_2')} \quad (13)$$

$$\mu_k = \frac{\sum_{n_1'=1}^{N} \sum_{n_2'=1}^{N} \sum_{k_1'=1}^{K} o_t \gamma(n_1',n_2',k_1',k)}{\sum_{n_1'=1}^{N} \sum_{n_2'=1}^{N} \sum_{k_1'=1}^{K} \gamma(n_1',n_2',k_1',k)} \quad (14)$$

$$\Sigma_k = \frac{\sum_{n_1'=1}^{N} \sum_{n_2'=1}^{N} \sum_{k_1'=1}^{K} (o_t - \mu_k)(o_t - \mu_k)^* \gamma(n_1',n_2',k_1',k)}{\sum_{n_1'=1}^{N} \sum_{n_2'=1}^{N} \sum_{k_1'=1}^{K} \gamma(n_1',n_2',k_1',k)} \quad (15)$$

In the above formulas, $\mu_k$ and $\epsilon_k$ are the mean vector and variance matrix when the output probability of feature vectors in internal state k is represented by Gaussian distribution.

Equation (6) representing the likelihood according to the present invention is rewritten as follows.

$$\lambda_{nk,j} \equiv b^{(1)}_{nk} a^{(2)}_{jk} \quad (16)$$

$$P(O|W) = \sum_{n_1=1}^{N} \cdots \sum_{n_T=1}^{N} \sum_{k_1=1}^{K} \cdots \sum_{k_T=1}^{K} \prod_{t=1}^{T} a^{(1)}_{n_{t-1} n_t} \lambda_{n_t k_t k_{t-1}} b^{(2)}_{k_t}(o_t) \quad (17)$$

In comparison of this equation with the semi-continuous HMM, the coefficient $\lambda_{nk,j}$ can be considered to be a mixing coefficient in the case of using the k-th output probability $b_k^{(2)}(O)$ in state n.

According to the present invention, however, the mixing coefficient depends on which output probability (as specified by the subscript j) is used in the preceding frame (that is, it has a Markovjan correlation). If an approximation is made such that there is no such correlation ($\lambda_{nk,j} = \lambda_{nk}$), the present invention is in accord with the prior art semi-continuous HMM. The semi-continuous HMM is detailed in X. D. Huang et al, "Semi-continuous Hidden Markov Models for Speech Signals", Computer Speech and Language, 1989 Vol. 3, pp. 239).

A method of introducing the Markovjan correlation to the preceding frame to the mixing coefficient in the mixture distribution HMM, is formulated as two-stage transition mixture distribution HMM (Prior art method 1). In this case, the likelihood is expressed as:

$$P(O|W) = \sum_{n_1=1}^{N} \cdots \sum_{n_T=1}^{N} \sum_{k_1=1}^{K} \cdots \sum_{k_T=1}^{K} \prod_{t=1}^{T} a_{n_{t-1} n_t} \lambda_{n_t k_t k_{t-1}} b_{n_t k_t}(o_t) \quad (18)$$

A first difference of this case from the present invention is that the feature vector output probability $b_{nk}(O)$ depends on both the state n and internal state k. In contrast, according to the invention, it depends on the internal state k only. This leads to a great increase of the output probability parameter number in the prior art method 1.

A second difference is that in the prior art method 1, the parameter number of the mixing coefficient $\lambda_{nj k,j}$ is N·K·K. According to the present invention, as is obvious from Equation (16), the mixing coefficient $\lambda_{nk,j}$ is decomposed to the product of the output probability $b_{nk}^{(1)}$ and transition probability $a_{jk}^{(2)}$, and the parameter number is thus reduced to (N·K+K·K). As an example, where the number of states is $N=2^{10}$ and the number of internal states is $K=2^8$, the parameter number is 4,000,000 in Prior art method 1 and 320,000 according to the invention. That is, the parameter number can be reduced to 1/200. According to the present invention, the parameter number is of the same order as in the case of the semi-continuous HMM.

Further, there has been proposed a heuristic method introducing frame correlation to the semi-continuous HMM mixing coefficient by using bigram probability of the code (VQ code) obtained through the vector quantization (VQ) (Prior art method 2). In this method, a new mixing coefficient $\hat{\lambda}_{nk,j}$ which is calculated by transformation as defined by the following Equation is used:

$$\hat{\lambda}_{nk,j} = \frac{a_{jk} \lambda_{nk}}{\sum_{k'=1}^{K} a_{jk'} \lambda_{nk'}} \quad (19)$$

where $\lambda_{nk}$ is the mixing coefficient of the k-th output probability (internal state k) in the state n of the semi-continuous HMM, and $a_{jk}$ is the bigram probability of VQ codes in the training data (i.e., bigram probability that VQ code j is followed by VQ code k as the next one), is used at the time of the recognition.

In this method, the vector quantization (VQ) process and re-calculation of the mixing coefficient with the above equation are necessary at the time of the recognition. In the present invention, no such extra calculation is necessary. Further, because the semi-continuous HMM and bigram probability of VQ codes, the two being different in nature, are combined, the above equation is not the optimum calculation formula based on statistical theory but is merely based on heuristic one.

Figure 2:
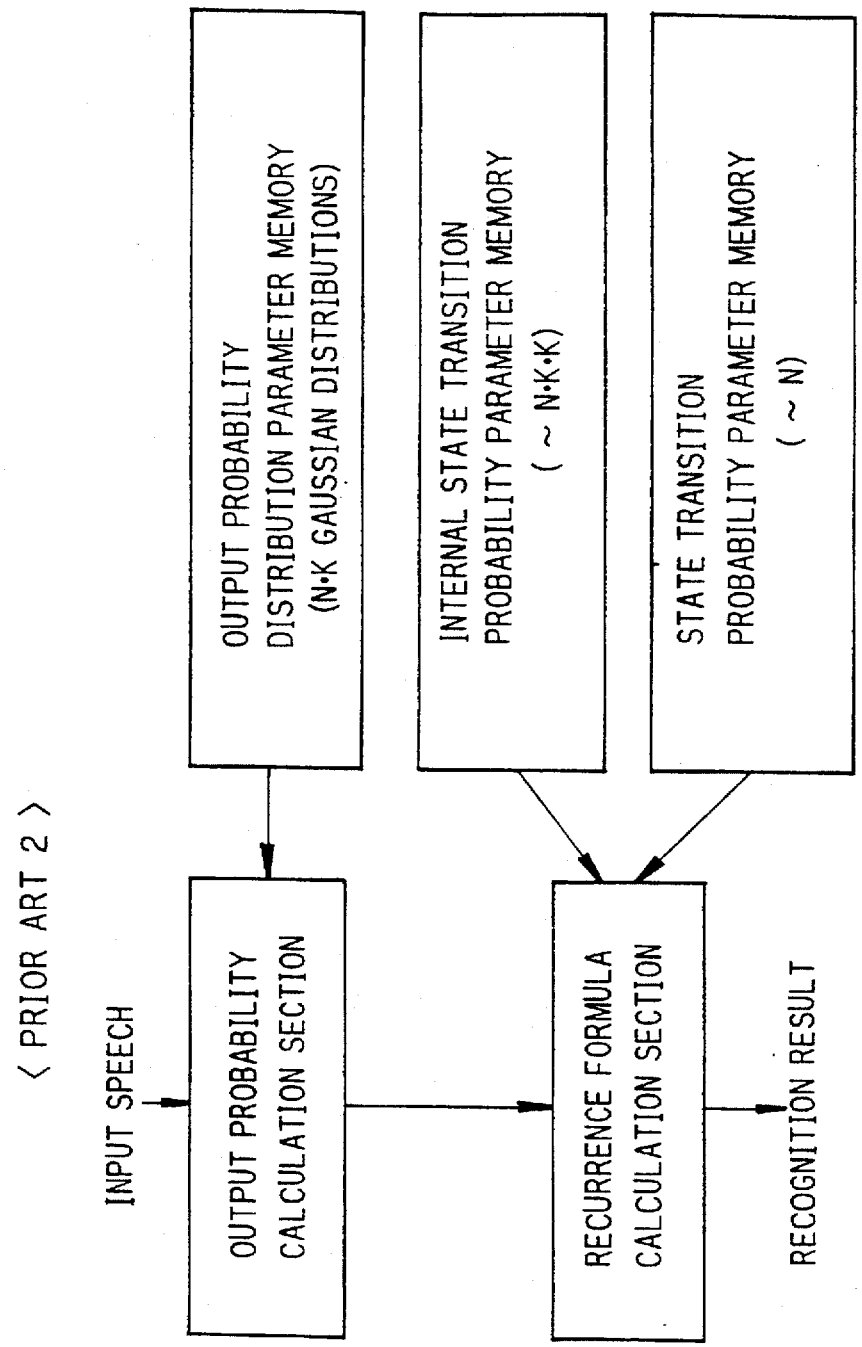
FIG. 2 shows a block diagram of a first conventional speech recognizer.
Figure 3:
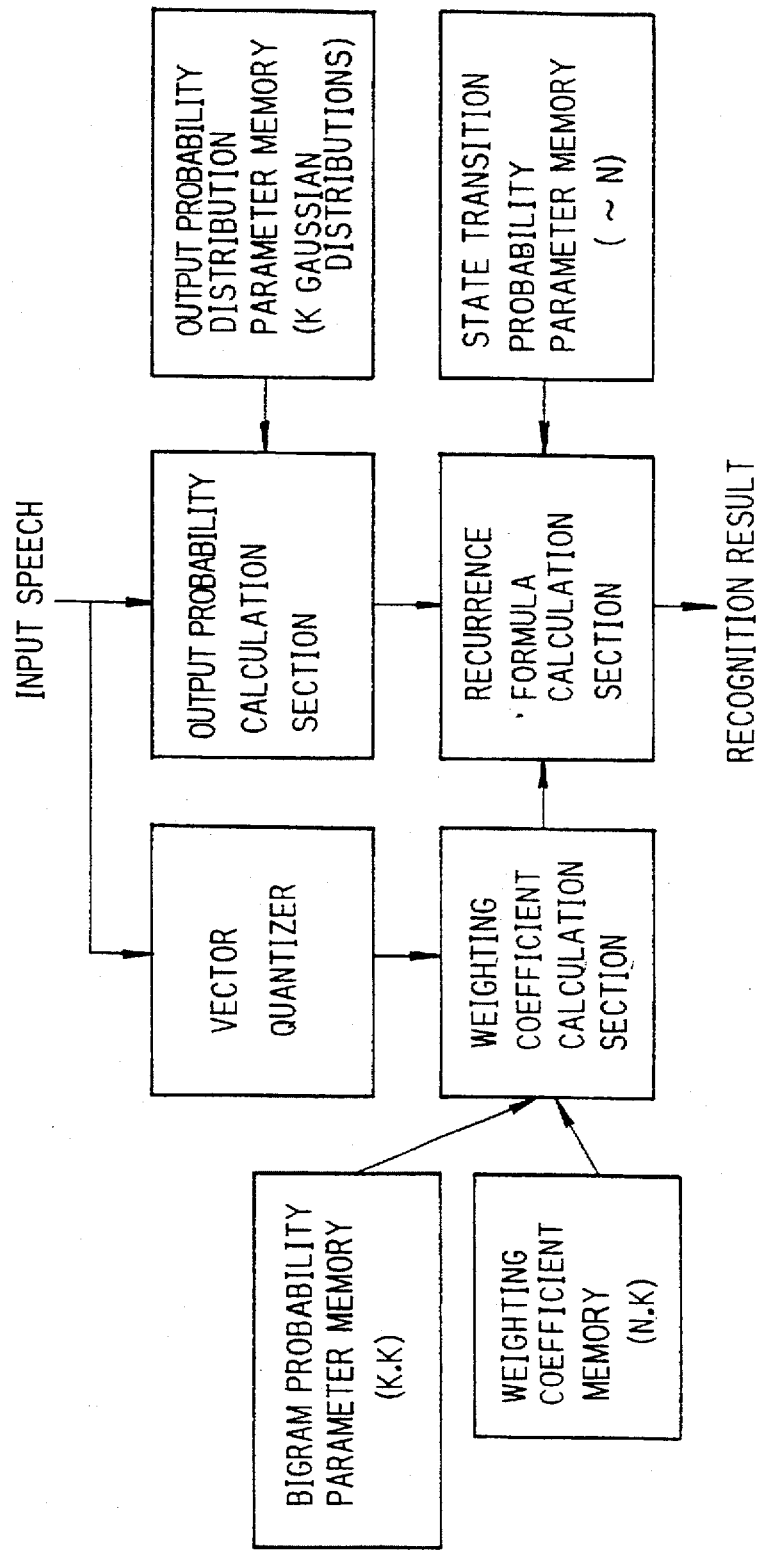
FIG. 3 shows a block diagram of a second conventional speech recognizer.
Figure 4:
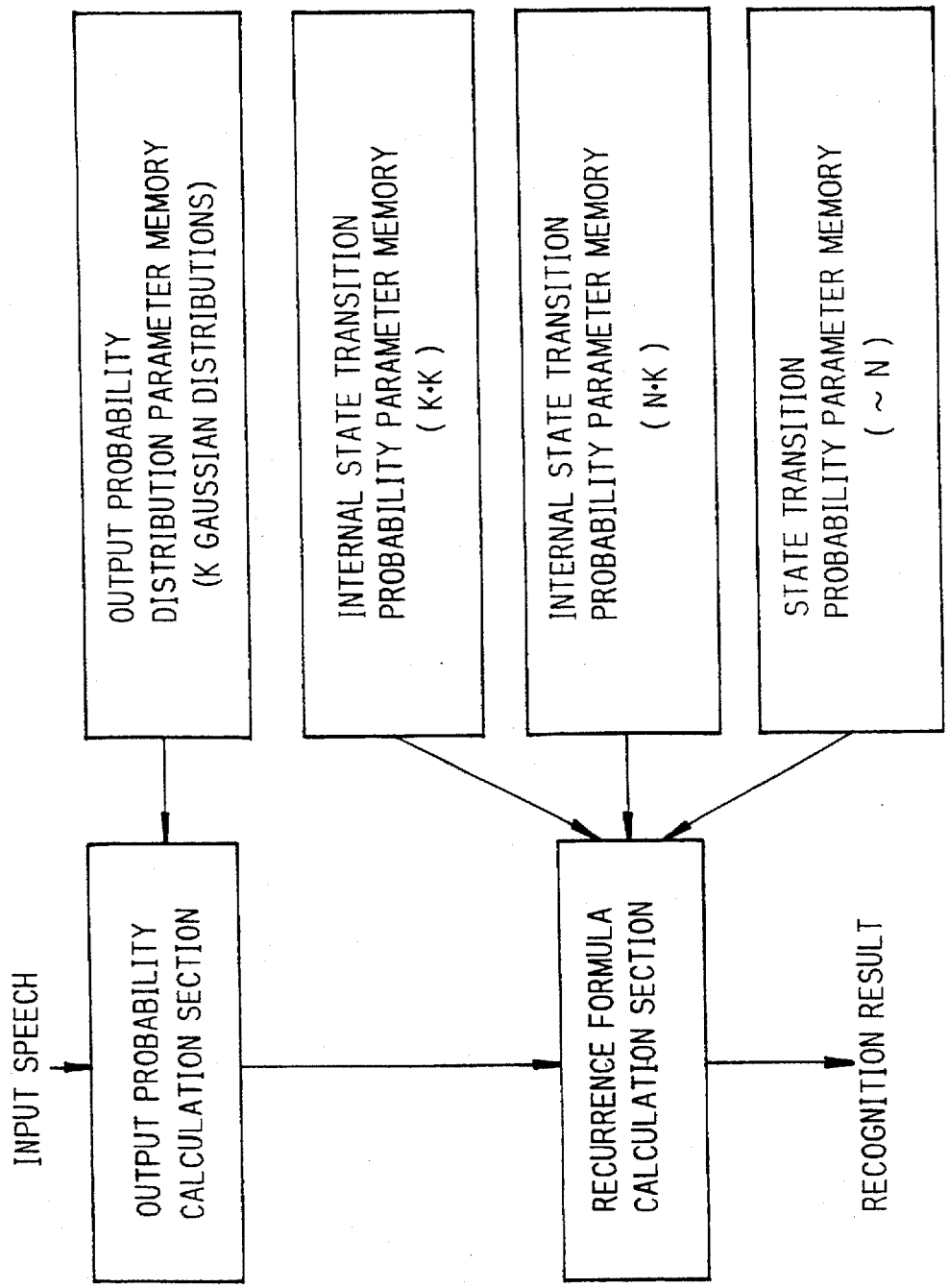
FIG. 4 shows a block diagram of one embodiment according to the present invention.

What has been described above is shown in FIG. 2 (Prior art method 1), FIG. 3 (Prior art method 2) and FIG. 4 (present invention). Comparison of these Figures will clarify the difference of the parameter number (necessary memory area) and calculation procedure.

According to the present invention, as is seen from Equation (7), forward probability recurrence formula calculation is made on the three-dimensional TRELIS specified by time t, state n and internal state k. In the prior art HMM, calculation for O(T·N) lattice points on the two-dimensional TRELIS specified by time t and state n was necessary. In the system according to the present invention, calculation for O(T·N·K) is necessary. To reduce the calculations and storage, the following sub-optimal approximation is utilized.

Forward probability, in which summation of the internal states k is taken on the two-dimensional TRELIS specified by time t and state n, is defined as:

$$\hat{\alpha}_t(n) = \sum_{k=1}^{K} \alpha_t(n,k) \quad (20)$$

$$= \sum_{k=1}^{K} \sum_{n'=1}^{N} \sum_{k'=1}^{K} \alpha_{t-1}(n',k') a_{nn'}^{(1)} b_{nk}^{(1)} a_{k'k}^{(2)} b_k^{(2)}(o_t)$$

$$= \sum_{n'=1}^{N} a_{nn'}^{(1)} \left\{ \sum_{k=1}^{K} b_{nk}^{(1)} b_k^{(2)}(o_t) \sum_{k'=1}^{K} \alpha_{t-1}(n',k') a_{k'k}^{(2)} \right\}$$

Also, internal state $\hat{k}_t(n)$ which gives the maximum probability on the two-dimensional TRELIS specified by time t and state n is defined as:

$$\hat{k}_t(n) = \arg\max_k[\alpha_t(n,k)] \quad (21)$$

Under the above definitions, approximation given by the following equation $$\sum_{k'=1}^{K} \alpha_t(n,k') a_{k'k}^{(2)} \approx a_{\hat{k}_t(n),k}^{(2)} \sum_{k'=1}^{K} \alpha_t(n,k') = a_{\hat{k}_t(n),k}^{(2)} \hat{\alpha}_t(n) \quad (22)$$

is introduced.

This approximation corresponds to the assumption that the forward probability is sufficiently low in the other internal states than the one $\hat{k}_t(n)$ corresponding to the maximum probability. Using this approximation, the following equation of probability recurrence on the two-dimensional TRELIS can be obtained.

$$\hat{\alpha}_t(n) = \sum_{n'=1}^{N} a_{nn'}^{(1)} \left\{ \sum_{k=1}^{K} b_{nk}^{(1)} b_k^{(2)}(o_t) \sum_{k'=1}^{K} \alpha_{t-1}(n',k') a_{k'k}^{(2)} \right\} \quad (23)$$

$$\approx \sum_{n'=1}^{N} a_{nn'}^{(1)} \left\{ \sum_{k=1}^{K} b_{nk}^{(1)} b_k^{(2)}(o_t) a_{\hat{k}_{t-1}(n'),k}^{(2)} \right\} \hat{\alpha}_{t-1}(n')$$

Thus, the following calculating algorithm of sub-optimal recurrence on the two-dimensional TRELIS can be obtained.

$$\alpha_t(n,k) = \sum_{n'=1}^{N} a_{nn'}^{(1)} b_{nk}^{(1)} b_k^{(2)}(o_t) a_{\hat{k}_{t-1}(n'),k}^{(2)} \hat{\alpha}_{t-1}(n') \quad (24)$$

$$\hat{k}_t(n) = \arg\max_k[\alpha_t(n,k)]$$

$$\hat{\alpha}_t(n) = \sum_{k=1}^{K} \alpha_t(n,k)$$

In time (frame) synchronous recurrence formula calculation, it is necessary to store only the forward probability $\hat{\alpha}_t(n)$ and the optimum internal state $\hat{k}_t(n)$, and thus both the operation and storage amounts can be reduced to be comparable with those in the case of the semi-continuous HMM.

Figure 5:
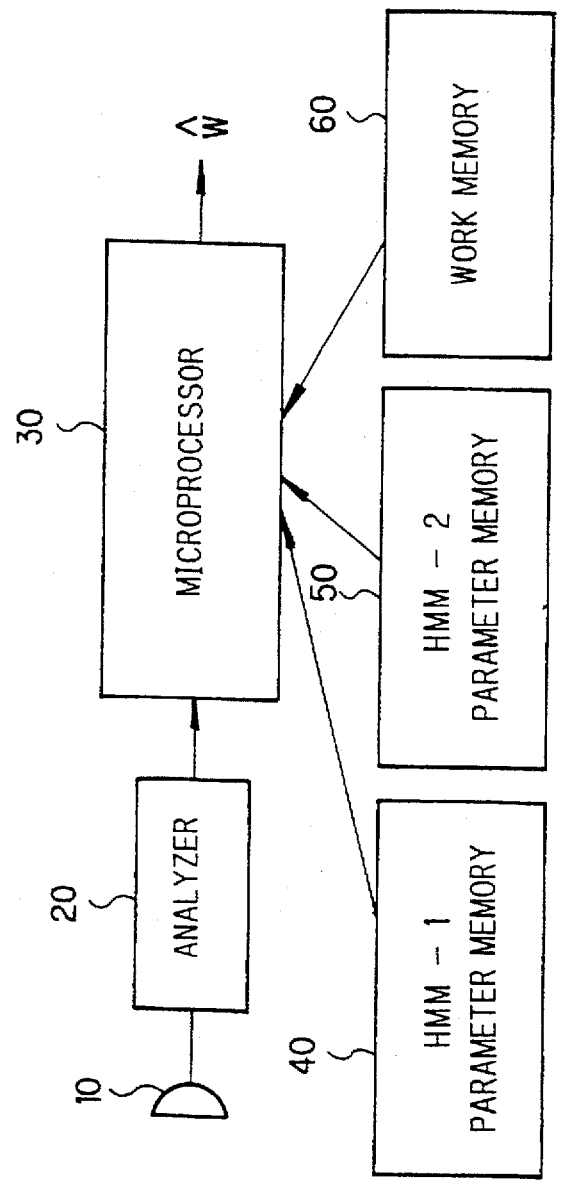
FIG. 5 shows a block diagram of the apparatus according to one embodiment of the present invention.

FIG. 5 is a block diagram showing a word speech recognizer according to the present invention. Speech signal obtained by a microphone 10 is sampled, digitized and then converted to feature vectors through Fast Fourier transform or the like in an analyzer. The output of the analyzer 20 is fed to a microprocessor 30 connected to a HMM-1 and a HMM-2 parameter memory 40 and 50 and a work memory 60.

In the HMM-1 parameter memory 40 are stored, as first HMM parameters of individual words w, transition probability $a_{mn}^{(1)}$ (m, n=1, ..., $N_w$) from state m to state n, and probability $b_{nk}^{(1)}$ (k=1, ..., K) of outputting output symbol $s_k$ in state n. In the HMM-2 parameter memory 50 are stored second HMM parameters common to all the words, i.e., parameters of distribution functions representing transition probability $a_{jk}^{(2)}$ (j, k=1, ..., K) from internal state j to internal state k and output probability $b_k^{(2)}$ ($o_t$) of outputting feature vector $o_t$ in internal state k (mean vector and covariance matrix in the case of the Gaussian distribution). The work memory 60 is a working area for tentatively storing the output probability and a forward probability when calculating the likelihood value of each word to be recognized with a reference pattern model. It is possible that the HMM-1 and HMM-2 parameter memories 40 and 50 and work memory 60 be defined as distinct memory areas in the microprocessor main memory.

Figure 6:
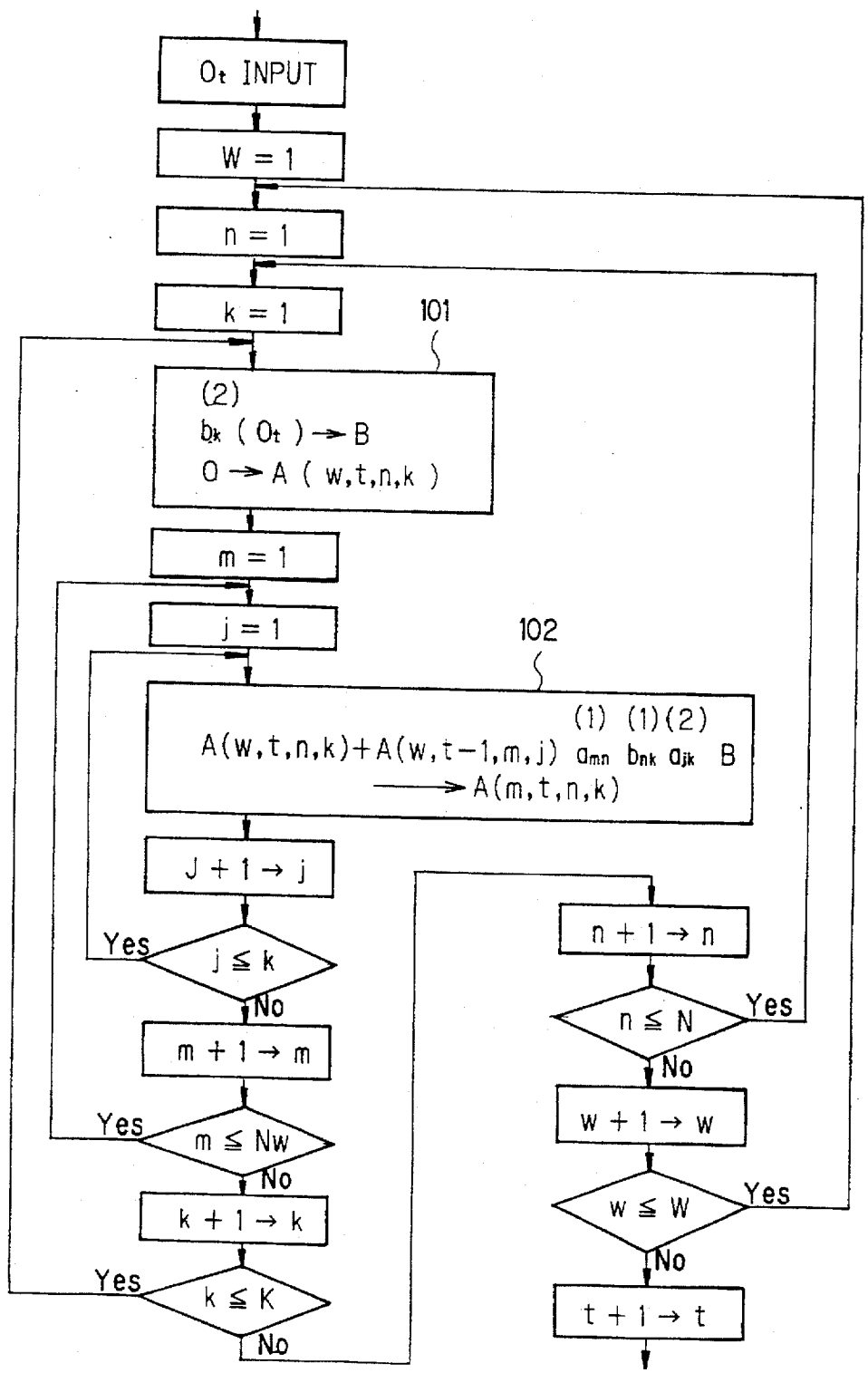
FIG. 6 shows a flowchart of the processes executed in the embodiment of the present invention.

The recognizing process is executed in accordance with a program in the microprocessor 30. Specifically, whenever input signal feature vector $o_t$ is supplied, the microprocessor 30 executes a routine as shown by the flow chart in FIG. 6. In a step shown as block 101 in the flow chart, output probability $b_k^{(2)}$ ($o_t$) of outputting the feature vector $o_t$ in the internal state k is calculated on the basis of the output probability distribution parameters stored in the HMM-2 parameter memory 50 and stored as variable B in the work memory 70. Further, array variables A (w,t,n,k) in the work memory 60 for calculating the forward probability are cleared. In a step shown as block 102, contribution to forward probability when the feature vector $o_t$ is output through transition from state m and internal state j to state n and internal state k, is calculated from the parameters stored in the HMM-1 and HMM-2 parameter memories 40 and 50 and work memory 60 and added to the array variables A (w,t,n,k).

When the above routine is ended, the time instant of the input signal is incremented by one unit time to be ready for the input of the next feature vector $o_t$ for the same routine. When the routine for the last feature vector $o_T$ is over with the end of the input signal, the following process is executed in the microprocessor 30. The forward probability that is calculated based on the array variables A (w,T,n,k) for each word w and that is stored in the work memory 70 gives word output probability (likelihood value) of outputting input signal by the reference pattern model for each word. These values are compared successively to obtain the maximum value, and the corresponding word w=ŵ is output as recognition result.

In the embodiment, it is enough to store in the work memory 60 the array variables A (w,t,n,k) at instant t only those for times t and (t−1), not for all the times. This means that the size of the array variable storage area is 2·W·N·K.

Figure 7:
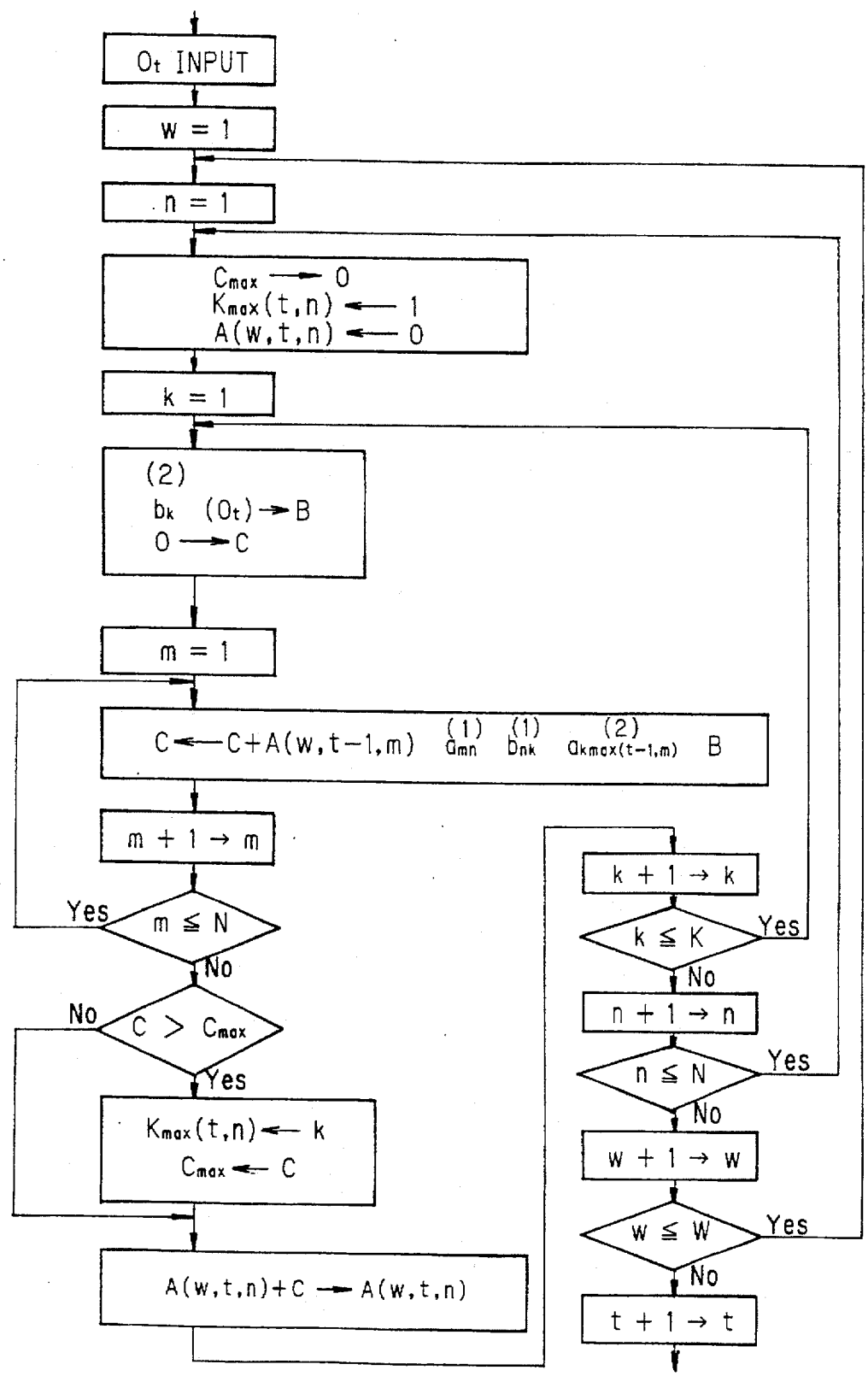
FIG. 7 shows a flowchart of the processes executed in the embodiment of the present invention.

According to the embodiment, the size of the storage area can be further reduced. FIG. 7 shows a flow chart in the embodiment. Array variables that are necessary for the calculation are $k_{max}$(t,n) and A (w,t,n). In either case, it is necessary at instant t to preserve only array variables for times t and (t−1). Thus, the necessary storage area size is 2·N+2·W·N and reduced to about 1/K. Further, as for the operation amount, it will be seen from the comparison of FIGS. 6 and 7 that in the case of FIG. 7 the operation amount is reduced to an extent corresponding to the absence of iterative calculation concerning the variable j.

As has been described in the foregoing, according to the invention it is possible to solve the problem of the discontinuities at the HMM state transition boundaries so as to obtain highly accurate modeling of signals and realize a low cost and high performance speech recognizer with a greatly reduced parameter number compared to Prior art method 1 and also without vector quantization or heuristic re-calculation of coefficients as involved in Prior art method 2.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A speech recognizer implemented in a programmed processor and configured to recognize input speech by analyzing the input speech at predetermined time intervals, extracting feature vectors and calculating a likelihood value of a reference pattern model of each category in a plurality of categories to be recognized, comprising:

receiving means for receiving the input speech;

extracting means for extracting the feature vectors from the input speech;

first probability calculation means for calculating a probability that a first hidden Markov model having an internal state number as an output symbol for each category to be recognized outputs an internal state number and for outputting a series of the internal state numbers;

second probability calculation means for calculating a probability that a second hidden Markov model having transition probabilities of the internal state numbers and feature vector output probability distributions for each of the respective internal state numbers outputs a feature vector and for outputting a series of the feature vectors; and likelihood probability calculation means for calculating a probability of a reference pattern model of each category to be recognized by using the outputs of the first and second probability calculation means, wherein the reference pattern model corresponding to a highest probability is output as a recognition result of the input speech.

2. The speech recognizer as set forth in claim 1, wherein the likelihood probability calculation means executes the probability calculation by using only the internal state numbers providing the maximum probability at the predetermined time intervals on an input speech feature vector time series time axis and in each state of the first hidden Markov model of each category to be recognized.

3. A speech recognizer comprising:

receiving means for receiving input speech;

extracting means for extracting at least one feature vector from the input speech;

a first HMM parameter memory for storing as first HMM parameters of individual words w, transition probability $a_{mn}^{(1)}$ m, n=1, . . . , $N_w$) from state m to state n, and probability $b_{nk}^{(1)}$ (k=1, . . . , K) of outputting output symbol $s_k$ in state n, wherein $N_w$ represents a total number of states in the word w and K represents a total number of internal state numbers;

a second HMM parameter memory for storing, as second HMM parameters common to all of the words, parameters of distribution functions representing transition probability $a_{jk}^{(2)}$ (j, k=1, . . . , K) from internal state j to internal state k and output probability $b_k^{(2)}$ ($o_t$) of outputting feature vector $o_t$ in internal state k;

a work memory for tentatively storing the output probability and array variables A (w,t,n,k) representing a forward probability when calculating the likelihood value of each word to be recognized with a reference pattern model, where t represents an instant in time; and recognition processing means implemented in a programmed processor, the recognition processing means including:

first calculation means for calculating the output probability $b_k^{(2)}$ ($o_t$) of outputting the feature vector $o_t$ in the internal state k on the basis of the output probability distribution parameters stored in the second HMM parameter memory and storing the output probability as variable B in the work memory, the feature vector $o_t$ corresponding to the at least one feature vector extracted by the extracting means;

clearing means for clearing the array variables A (w,t, n,k) in the work memory for calculating the forward probability;

second calculation means for calculating a contribution to the forward probability when the feature vector $o_t$ is output through transition from state m and internal state j to state n and internal state k, from the parameters stored in the first and second HMM parameter memories and work memory and adding the forward probability to the array variables A (w,t,n,k) representing the forward probability;

means for comparing the forward probability A (w,T,n,k) for each word w stored in the work memory successively to obtain one of the words w having a maximum comparison value, where T represents a total number of time intervals of the input speech; and outputting means for outputting the one word having the maximum comparison value as a recognition result.

4. The speech recognizer as set forth in claim 3, wherein the work memory stores the array variables A (w,t,n,k) only for times t and (t−1).

5. The speech recognizer as set forth in claim 3, wherein the first and second HMM parameter memories and work memory are defined as distinct memory areas in a main memory.

6. A word speech recognizer for recognizing words from a speech signal, comprising:

an input unit for inputting the speech signal;

a feature vector extraction unit connected to the input unit and configured to sample the speech signal, digitize the sampled speech signal, and convert the digitized sampled speech signal into at least one feature vector a first Hidden Markov Model (HMM) parameter memory configured to store first HMM parameters of a plurality of words, transition probabilities $a_{mn}$ for transitioning from state m to state n, wherein m and n are integers and wherein there are k possible states, k being an integer greater than or equal to m and n, the first HMM parameter memory being configured to store a probabilities $b_{rs}$ of outputting a symbol s in a state r, wherein r and s are integers;

a second HMM parameter memory configured to store second HMM parameters common to all of the plurality of words, which correspond to distribution functions representing transition probabilities $a_{jk}$ from internal state j to internal state k, and which correspond to output probabilities $b_k(o_t)$ of outputting feature vector $o_t$ in the internal state k;

a work memory for temporarily storing the output probabilities, the work memory also temporarily storing a forward probability and array variables associated with the forward probability; and a processor coupled to the feature vector extraction unit, the first HMM parameter memory, the second HMM parameter memory, and the work memory, the processor comprising:

a calculating unit configured to receive the feature vector $o_1$ from the feature vector extraction unit and to calculate the output probability $b_k(o_1)$ of outputting the feature vector $o_1$ in the internal state $b_k$ based on the second HMM parameters stored in the second HMM parameter memory, the output probability $b_k(o_1)$ being stored by the processor in the work memory;

a clearing unit configured to clear the forward probabilities stored in the work memory;

a forward probability calculating unit configured to calculate the forward probability for each of the plurality of words when the feature vector $o_1$ is output through transition from the state m and the internal state j to the state n and the internal state k, the forward probability being calculated based on the first HMM parameters stored in the first HMM parameter memory and the second HMM parameters stored in the second HMM parameter memory; and a determining unit for determining a maximum probability of the forward probabilities calculated for each of the plurality of words, wherein the corresponding word having the maximum probability is output as a recognized word of the speech signal.

* * * * *